United States Patent [19]
Aubrey et al.

[11] Patent Number: 5,673,902
[45] Date of Patent: Oct. 7, 1997

[54] DUAL STAGE CERAMIC FOAM FILTRATION SYSTEM AND METHOD

[75] Inventors: Leonard S. Aubrey, Arden; Clifton L. Oliver, Fairview; Bruce T. MacPhail, Asheville, all of N.C.

[73] Assignee: Selee Corporation, Hendersonville, N.C.

[21] Appl. No.: 595,386

[22] Filed: Feb. 1, 1996

[51] Int. Cl.⁶ .................................................. C21B 3/04
[52] U.S. Cl. ......................... 266/229; 266/227; 210/69
[58] Field of Search .......................... 266/227, 229, 266/231; 210/773, 510, 69; 75/407

[56] References Cited

U.S. PATENT DOCUMENTS

| | | | |
|---|---|---|---|
| 732,659 | 6/1903 | Scott | 210/69 |
| 1,235,395 | 7/1917 | Storm | 210/69 |
| 2,682,315 | 6/1954 | Evans | 210/62 |
| 2,715,063 | 8/1955 | Weiss | 210/69 |
| 2,840,463 | 6/1958 | Stroup et al. | 75/68 |
| 2,863,558 | 12/1958 | Brondyke et al. | 210/69 |
| 3,006,473 | 10/1961 | Gamber | 210/69 |
| 3,025,155 | 3/1962 | Lee et al. | 75/68 |
| 3,039,864 | 6/1962 | Hess et al. | 75/67 |
| 3,490,897 | 1/1970 | Dore et al. | 75/76 |
| 3,654,150 | 4/1972 | Eccles | 210/69 |
| 3,737,303 | 6/1973 | Blayden et al. | 75/68 |
| 3,737,304 | 6/1973 | Blayden et al. | 75/68 |
| 3,737,305 | 6/1973 | Blayden et al. | 266/227 |
| 3,753,690 | 8/1973 | Emley et al. | 266/227 |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 4,007,923 | 2/1977 | Chia | 266/227 |
| 4,024,056 | 5/1977 | Yarwood et al. | 210/69 |
| 4,024,212 | 5/1977 | Dore et al. | 266/44 |
| 4,032,124 | 6/1977 | Yarwood et al. | 266/231 |
| 4,052,198 | 10/1977 | Yarwood et al. | 266/227 |
| 4,062,771 | 12/1977 | Saupe | 210/23 |
| 4,067,731 | 1/1978 | Chia | 75/68 |
| 4,075,303 | 2/1978 | Yarwood et al. | 264/44 |
| 4,081,371 | 3/1978 | Yarwood et al. | 266/227 |
| 4,092,153 | 5/1978 | Yarwood et al. | 266/227 |
| 4,154,689 | 5/1979 | Yarwood et al. | 210/510 |
| 4,158,632 | 6/1979 | Dantzig et al. | 210/510 |
| 4,159,104 | 6/1979 | Dantzig et al. | 266/215 |
| 4,165,235 | 8/1979 | Dantzig et al. | 266/227 |
| 4,384,888 | 5/1983 | Yu | 75/68 |
| 4,390,364 | 6/1983 | Yu | 75/68 |
| 4,640,497 | 2/1987 | Heamon | 266/227 |
| 4,769,158 | 9/1988 | Eckert | 75/407 |
| 4,790,873 | 12/1988 | Gesing et al. | 75/68 |
| 4,999,101 | 3/1991 | Tadayon | 266/227 |
| 5,114,472 | 5/1992 | Eckert et al. | 266/227 |
| 5,122,184 | 6/1992 | Eckert et al. | 210/780 |
| 5,322,546 | 6/1994 | Holsgrove et al. | 266/227 |
| 5,336,295 | 8/1994 | DeYoung et al. | 266/227 |

*Primary Examiner*—Scott Kastler
*Attorney, Agent, or Firm*—Carter & Schnedler

[57] ABSTRACT

There is provided a dual stage ceramic foam molten metal filtration system and method. Coarse and fine filters are mounted adjacent to one another in a molten metal flow path. A convection preheat apparatus provides preheat for both filters. A vent structure is included to vent air which may be trapped in a gap which is formed between the two filters.

48 Claims, 8 Drawing Sheets

DUAL STAGE CERAMIC FOAM FILTRATION SYSTEM AND METHOD

BACKGROUND OF THE INVENTION

This invention relates to the removal of inclusions from molten metal. More particularly, it relates to the use of two ceramic foam filters in series in the molten metal flow path to more efficiently remove inclusions from molten metal.

The presence of insoluble inclusions including solid particles, such as oxides, carbides, nitrides and boraxides, and liquids, such as molten salts, in metals, such as aluminum, can significantly affect both plastic deformation during rolling or extrusion, as well as the final surface quality of the metal. Ceramic foam filters were developed by SELEE Corporation, assignee of the present invention, in 1974 to remove a substantial amount of such inclusions from molten aluminum. Today, ceramic foam filter technology is the primary and preferred method to filter commercial aluminum alloys throughout the world. The rapid expansion of this technology to aluminum cast shops of all types and levels of sophistication is due to the low cost of installation and operation and ease of use.

Over the years, there has been a steady progression towards the use of finer pore ceramic foam filters to provide better melt cleanliness demanded by the increasing quality levels imposed upon fabrication aluminum products. For example, in aluminum can body sheet applications, 40 and 50 pores per inch (PPI) SELEE foam filters are now routinely used in the production of sheet ingots. In addition, finer pore filters are currently being evaluated. However, the use of significantly finer pore filters requires significant pretreatment to reduce the incoming level of inclusions to prevent premature blocking or plugging of the filter with the retained inclusion material.

There have been disclosures and discussions in prior art patents regarding the use of dual filtration systems. One such disclosure is set forth in U.S. Pat. No. 3,962,081 issued to Yarwood et al and assigned to SELEE Corporation. The Yarwood patent broadly discloses the desirability of utilizing a series of filters having decreasing permeability which would be particularly useful in situations where the melts are especially dirty.

U.S. Pat. No. 4,032,124 also issued to Yarwood et al and also assigned to SELEE Corporation shows a dual filtration system having a first filter mounted above a second filter, a fluxing gas is injected between the two filters and the top filter serves as a plate to break up the fluxing gas to do a fine dispersion of the gas in order to assure interment and extensive contact with the melt.

U.S. Pat. No. 5,336,295 issued to D. Young et al and assigned to Aluminum Company of America teaches a dual filtration system including first and second filters mounted on the same plane on opposite sides of a settling zone so that suspended liquid particles in the molten metal separate by flotation in the settling zone.

U.S. Pat. No. 5,114,472 issued to Eckert et al and also assigned to Aluminum Company of America shows a two stage filter system including a pair of vertical filters and a gas sparger mounted adjacent to the front face of one filter to dislodge solids from the filter as the filter cakes. In the preferred embodiment, the filters are in the form of nested cylinders.

It is not believed that the prior art dual stage filters systems set forth above have achieved commercial success. In addition, these prior dual stage systems do not provide for a simple and convenient way to preheat the two filters.

OBJECTS OF THE INVENTION

It is therefore one object of this invention to provide an improved metal filtration system and method.

It is another object of this invention to provide a dual stage metal filtration system which is compact, easy to install and to use, and is low in operating cost.

It is still another object of this invention to provide a dual stage filtration system and method which is easy to preheat, easy to prime during start UP, easy to clean up, and results in less drain metal.

It is yet another object to provide a dual stage filtration system and method which removes significantly more inclusions than a single stage system while not significantly adding to the cost of processing the metal.

SUMMARY OF THE INVENTION

In accordance with one form of, this invention, there is provided an apparatus for removing inclusions from molten metal, including a container having a molten metal input and a molten metal output. A molten metal flow path is provided between the input and the output. A first porous ceramic filter is located in the flow path. A second porous ceramic filter is also located in the flow path between the first filter and the output. The first filter has a porosity of between 20 PPI and 60 PPI. The second filter has a porosity of between 40 PPI and 100 PPI. The second filter has a finer porosity than the first filter. Preferably the second filter is at least 10 PPI finer than the first filter. It is also preferred that the first filter is located above the second filter and that each of the filters are inclined at an angle from the horizontal so that air trapped under either of the filters may be more easily removed.

In accordance with another form of this invention, there is provided an apparatus and method for removing inclusions from molten metal, including a container having a molten metal input and a molten metal output. A molten metal flow path is located between the input and the output. A first porous ceramic filter is located in the flow path. A second porous ceramic filter is also located in the flow path between the first filter and the output. A convection-type preheating apparatus is attached to the container for providing hot gases or air to preheat the filters. A gas flow path is located between the convection preheating apparatus and one of the filters. The region adjacent to the filter which is in the convection flow path is preferably substantially sealed during the operation of the preheat apparatus so that a positive pressure is applied to that filter, whereby hot gases or air will flow through one filter to the other filter, thereby preheating both filters with a minimum temperature gradient.

In accordance with another form of this invention, there is provided an apparatus and method for removing inclusions from molten metal, including a container having a molten metal input and a molten metal output. A molten metal flow path is located between the input and the output. A first porous ceramic filter is located in the flow path. A second porous ceramic filter is also located in the flow path between the first filter and the output. The first filter is located above the second filter. A gap is provided between the first and second filters. An air vent structure is provided for venting air trapped in the gap between the filters during start up. Preferably, the air vent structure is in the form of a vent cone located on the top surface of the first filter. It is also preferred that the first filter is larger than the second filter, that is, the length of the major axis of the first filter is greater than the length of the second filter so that installation is made easier.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENT

Figure 1:
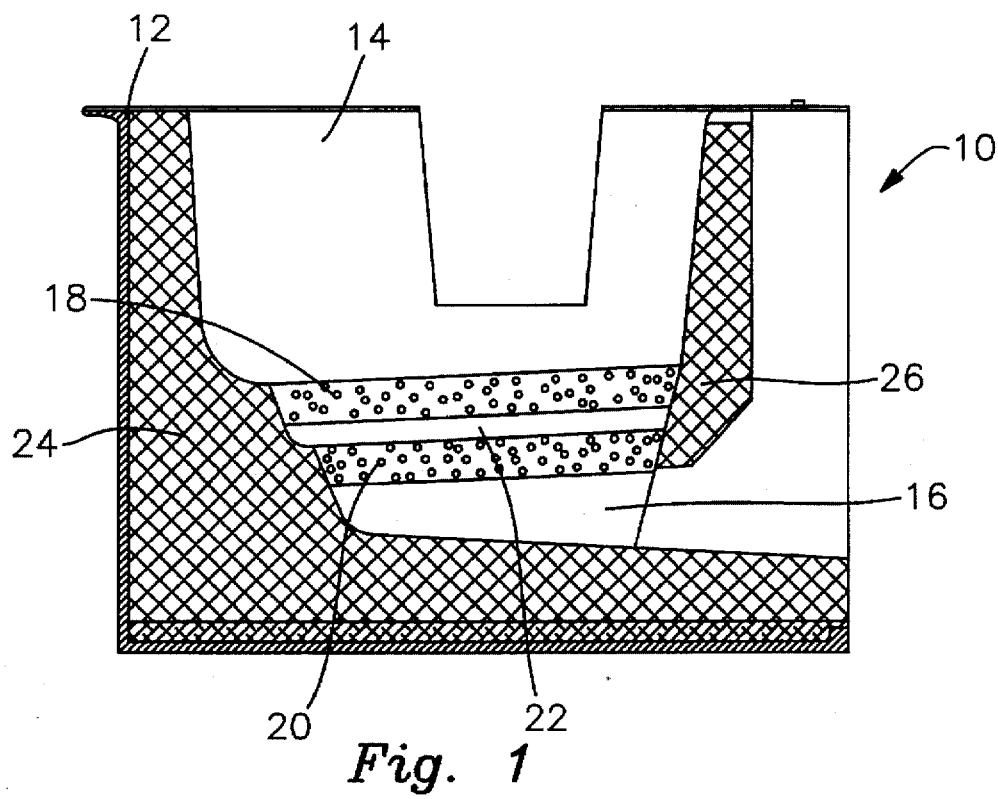
FIG. 1 is a sectional view of a dual stage filtration system of the present invention.
Figure 8:
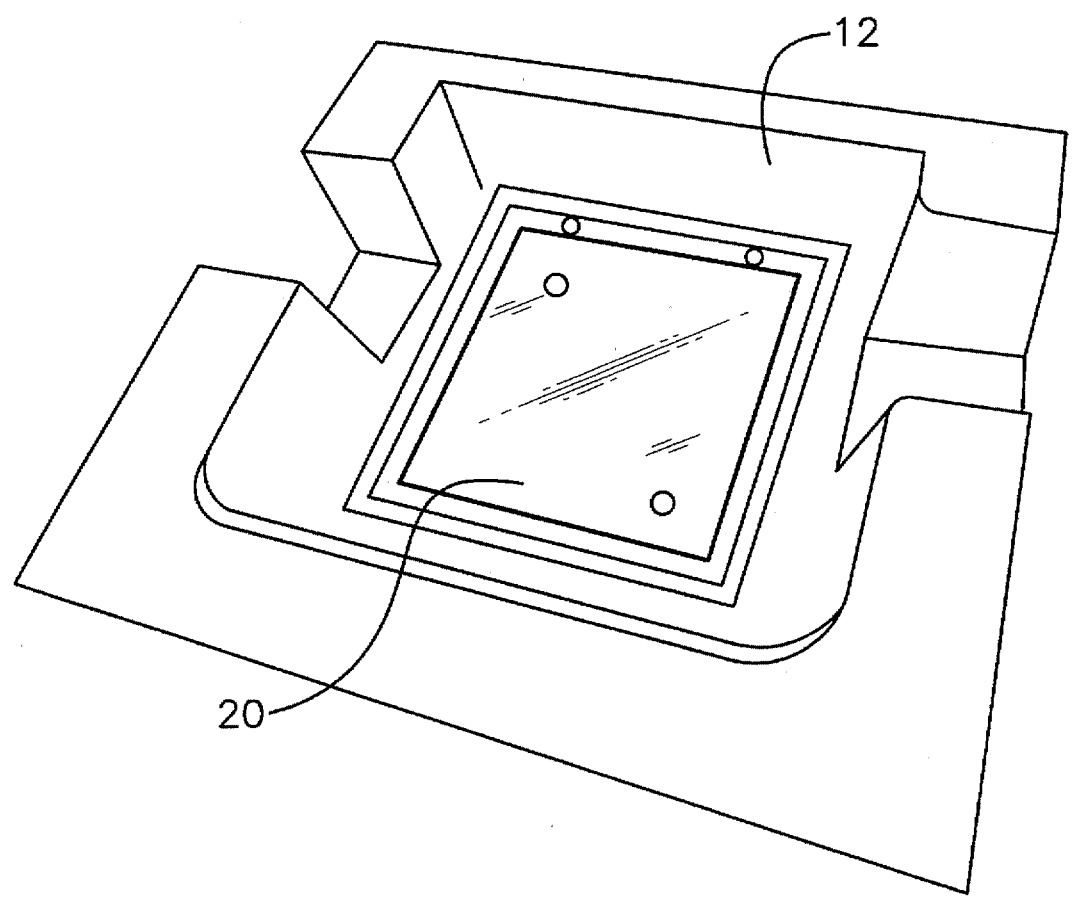
FIG. 8 is a pictorial view of the dual filtration system of FIG. 1 but showing only the bottom filter.
Figure 9:
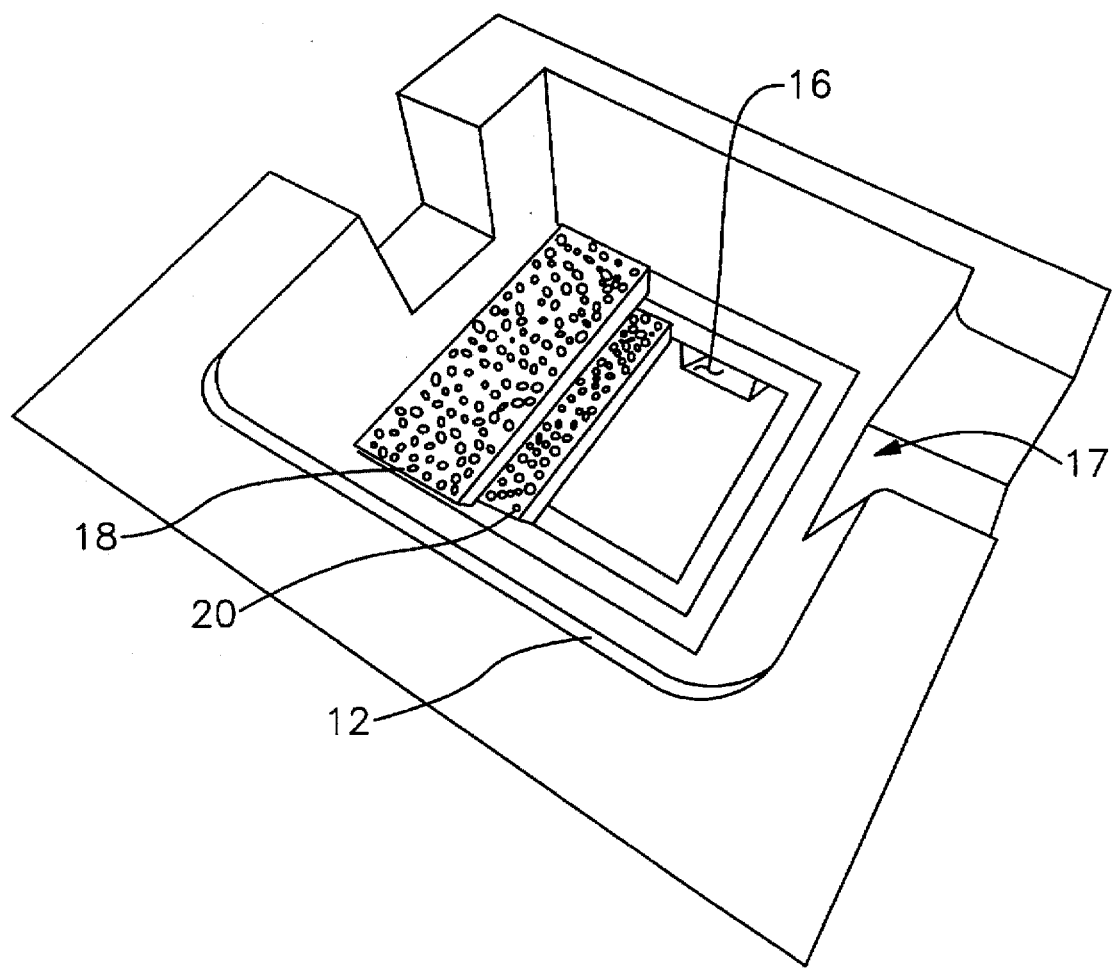
FIG. 9 is another pictorial view of the dual filtration system of FIG. 1 showing both the first and second filters.

Referring now more particularly to FIGS. 1, 8 and 9, there is provided a dual filtration system 10, including container 12 in the form of a refractory filter bowl. The filter bowl is preferably made of a precast monolithic construction utilizing a nonwettable fuse silica refractory material. One inch of insulating casting refractory generally should be placed between the steel shell and a monolithic bowl refractory.

Container 12 includes molten metal input 14 and molten metal output 16. Ceramic foam filters 18 and 20 are arranged within the bowl with filter 18 being located above filter 20. Gap 22 is formed between filters 18 and 20. Preferably gap 22 between the two filters is between ¼ inch to 3 inches in width, with the optimal gap being from 1 inch to 1½ inches in width. It is also preferred that filter 20 be of a finer pore size than filter 18.

Figure 10:
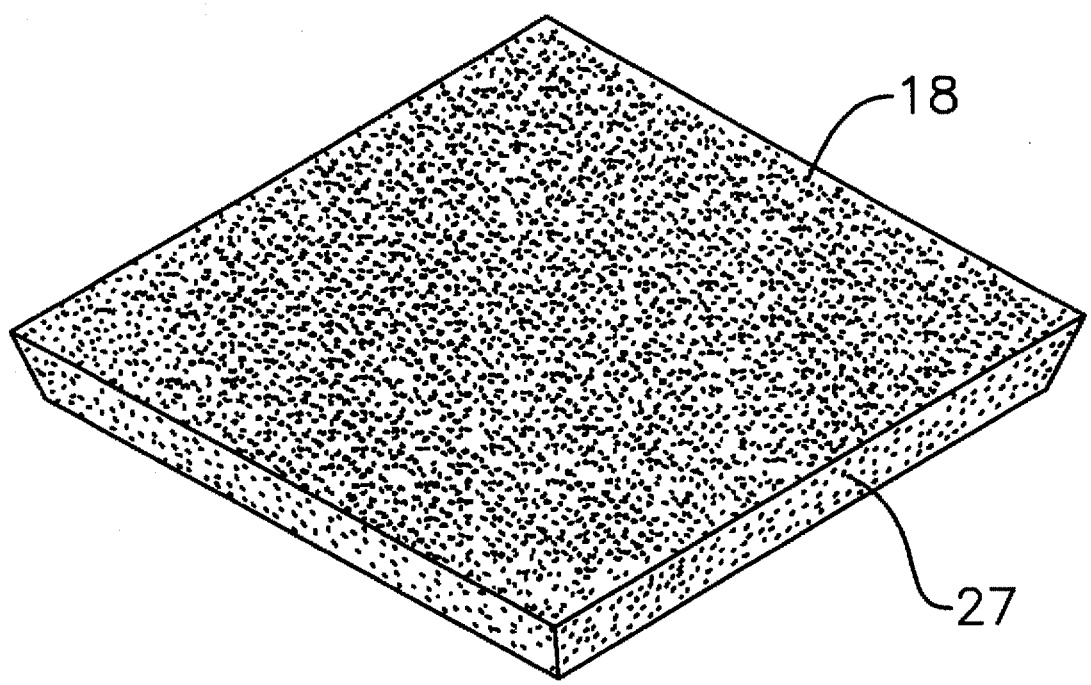
FIG. 10 is a prospective view of a ceramic foam filter which may be used with the dual filtration system of FIG. 1.

Filter 18 should have a pore or cell size in the range of 20 to 60 PPI, while the porosity of filter 20 should be in the range of 40 to 100 PPI. It is preferred that filter 20 be at least 10 PPI finer than filter 18. It is also preferred that each of these filters to be of a density such that the volume occupied by each filter is from 85% to 92% void. It is also preferred that the thicknesses of each filter be in the range from 1½ inches to 4 inches. Acceptable filters are SELEE ceramic foam filters commercially available from SELEE Corporation. An example of such filter is the tapered square shaped filter 18 shown in FIG. 10. The filters may be made in accordance with the teachings of U.S. Pat. No. 4,056,586, assigned to SELEE Corporation, which is hereby incorporated herein by reference.

It is preferred that the lower filter 20 be identical in shape but somewhat smaller than the upper filter 18, so that the major axis of filter 20 is from ¾ inch to 4 inches less than the major axis of filter 18. If the filters were the same size, it would be difficult to install the lower filter 20. With the lower filter being smaller, it is easier for the operator to install the filters within bowl 12. The lower portions 24 and 26 of the inside walls of the filter bowl 12 taper somewhat inwardly so that the filters 18 and 20 are regained within the bowl along their respective tapered edges 27.

Figure 2:
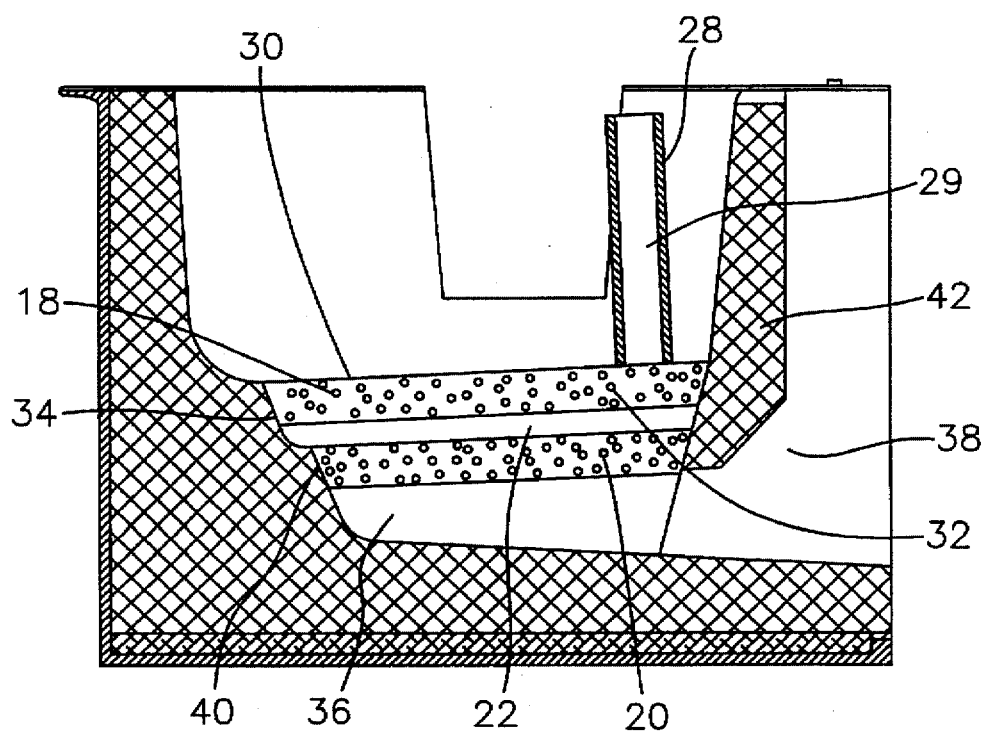
FIG. 2 is a sectional view of a dual stage filtration system of the present invention showing an alternative embodiment to that of FIG. 1.

Referring now more particularly to FIG. 2, there is provided an air vent structure in the form of air vent cone 28 which is sealed against the top surface 30 of the coarse upper filter 18. Air vent cone 28 is utilized during start up only, so as to vent air which is trapped in the gap 22 out of the filter bowl. During the priming of the filters when molten metal first flows into filter 18, air is forced out of the filter 18 into gap 22. However, since vent cone 28 is sealed to the portion of the top surface of filter 18 in region indicated by 32, an air flow path is provided through a portion of the filter from the air gap to the inside hollow portion 29 of the vent cone. Since filter 18 is inclined somewhat from the horizontal, air will tend to flow towards the highest point of gap 22 to a place underneath vent cone 28 so that substantially all of the trapped air is vented. This incline is provided by the less steep angle of shoulder 34 which forms a part of the inner wall of the filter bowl.

Filter 20 is also inclined somewhat from the horizontal so that any air which is trapped in the space 36 below filter 20 will vent away from filter 20 into space 38 and out of the filter bowl. Again, the inclination of filter 20 is caused by the less steep angle of shoulder 40. It is preferred that the angle of inclination from the horizontal for each filter be between ½° and 20°.

After the filters have been primed, vent cone 28 is removed from the top surface 30 of filter 18. Alternatively, one could provide a bore hole (not shown) through the right side 42 of the filter bowl in communication with gap 22 so as to vent the air which is trapped in gap 22. The bore hole would extend to the outside of the filter bowl. A filter having the characteristics of permitting air to pass therethrough, but not permitting molten metal to pass therethrough, would have to be provided in the form of a plug in the bore hole to prevent the expulsion of molten metal.

Figure 3:
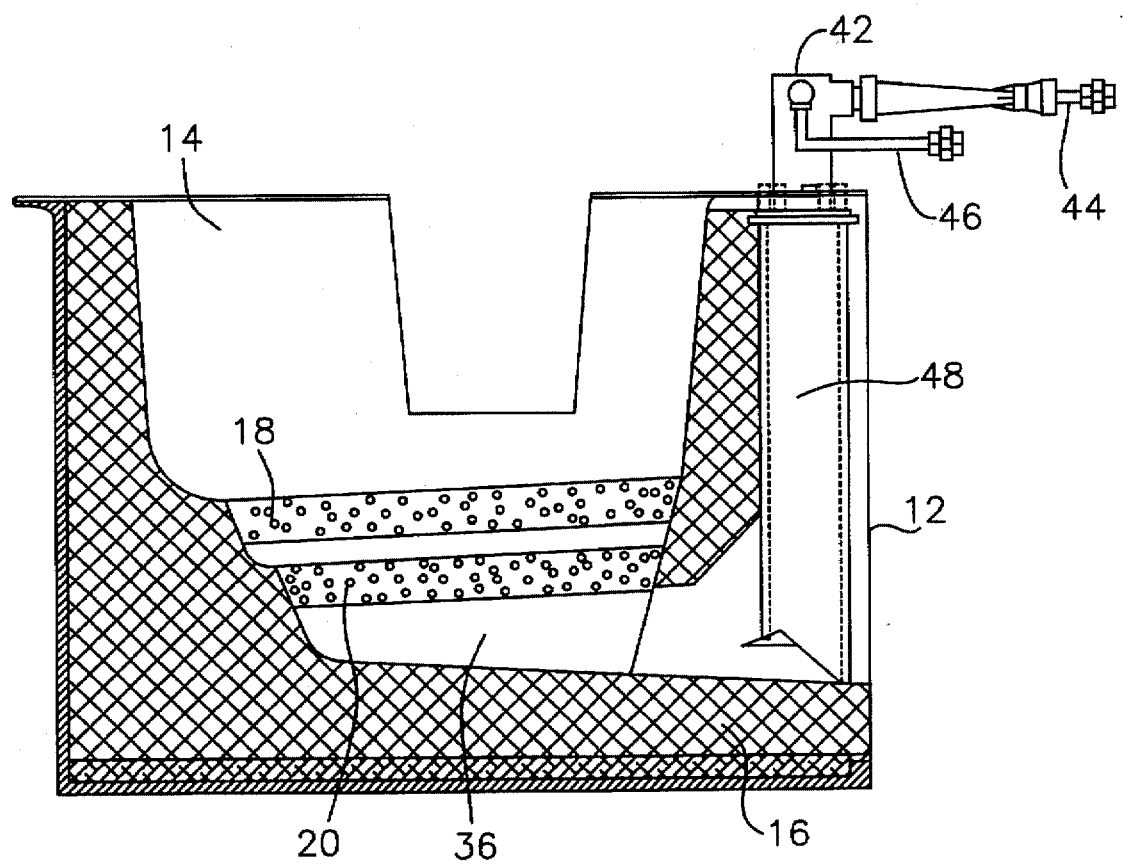
FIG. 3 is a sectional view of dual stage filtration system of the present invention showing another alternative embodiment to that of FIG. 1.

Referring now more particularly to FIG. 3, there is provided convection air preheat burner 42 which is preferably a nozzle mix preheat burner commercially available from the Eclipse Company, attached to bowl 12. Preferably, the preheat burner is a gas fired burner, however, an electric convective hot air blower may also be used. Preheat burner 42 includes gas input 44 and air input 46. It is preferred that the burner operate at a high excess air ratio, i.e., up to 600% so as to control the output temperature of the hot gases between 750° and 1,500° F. Preheat burner 42 is connected to air channel 48, which in turn is inserted in chamber 36 located below the fine filter 20. When the preheater is being operated, it is preferred that the output 16 (outlet) of the filter bowl be substantially sealed in a known fashion, such as by using the lower portion of the preheat burner, as shown in FIG. 3, so as to create a positive air pressure in chamber 36. With a positive air pressure in chamber 36, the hot air passes through filter 20 and in turn through filter 18 to substantially simultaneously preheat both of the filters. Once the filters reach a minimum temperature of approximately 1000° F., the preheater is turned off and molten metal is then poured into the bowl through input 14 after the preheat burner and thus the seal at the output 16 of the filter bowl or downstream has been removed. By utilizing the preheat arrangement set forth above, it has been found that both filters 18 and 20 may be heated to a temperature of 1000° F. in less than 15 minutes with a very minor thermal gradient from the bottom of filter 20 to the top of filter 18, i.e., approximately 200° F. Utilizing the construction of FIG. 3, one may thus simultaneously preheat two filters utilizing a single preheat burner.

Alternatively, the preheat burner may be exposed to the top of filter 18 and the preheat process is reversed, that is the input side 14 of the filter bowl is substantially sealed in a known fashion and a positive air pressure is placed on the top side of filter 18 so that hot air will pass first through filter 18 and then through filter 20, thereby preheating both filters.

Figure 4:
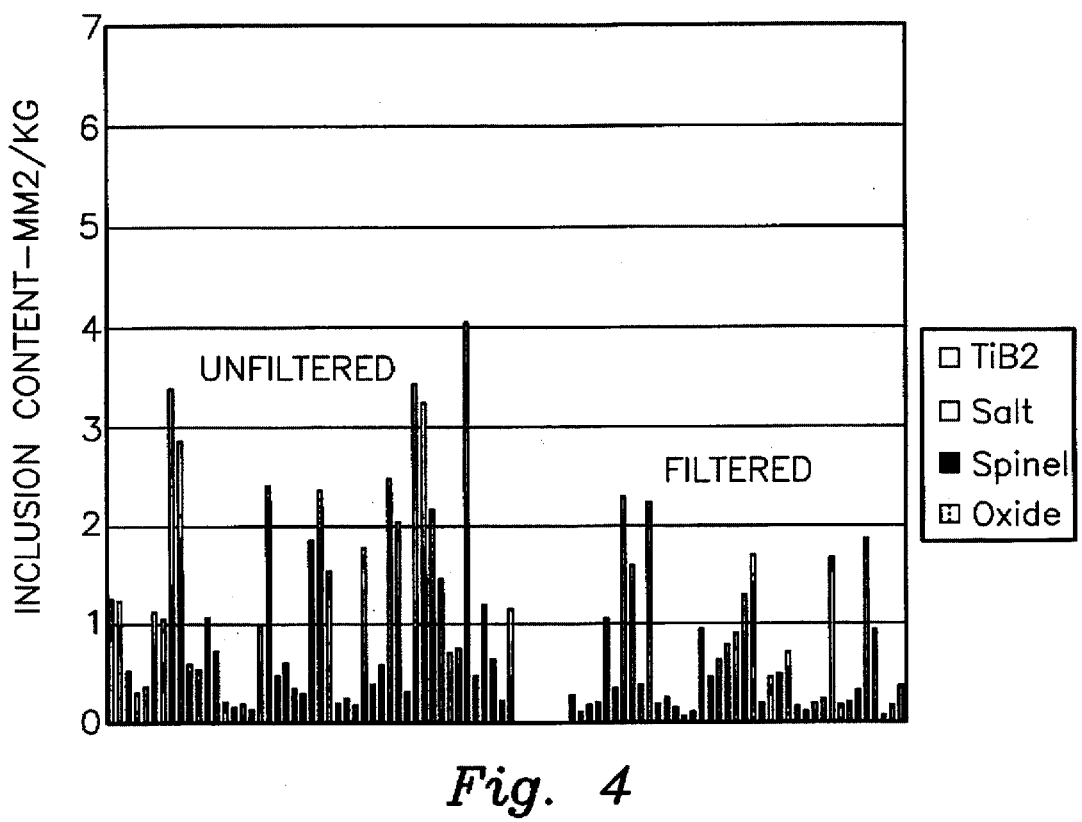
FIG. 4 is a graph showing a comparison between filtered and unfiltered metal using a prior art single stage system.
Figure 5:
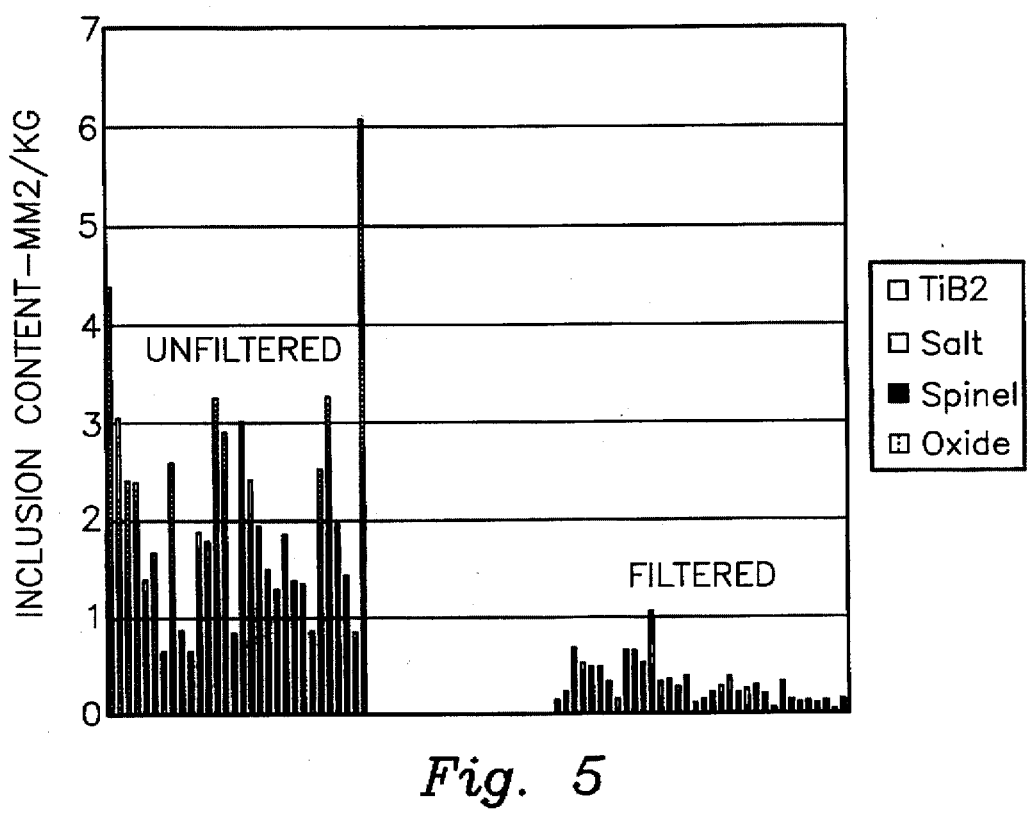
FIG. 5 is a graph comparing filtered and unfiltered metal utilizing the dual stage system of the present invention.

FIGS. 4 and 5 are graphs comparing the amounts of inclusions in filtered aluminum utilizing a single filter (FIG. 4) and a dual filter system of the subject invention (FIG. 5). As can be seen, by utilizing the filtering system of the subject invention, a substantial improvement in the inclusion content of the aluminum is provided.

Figure 6:
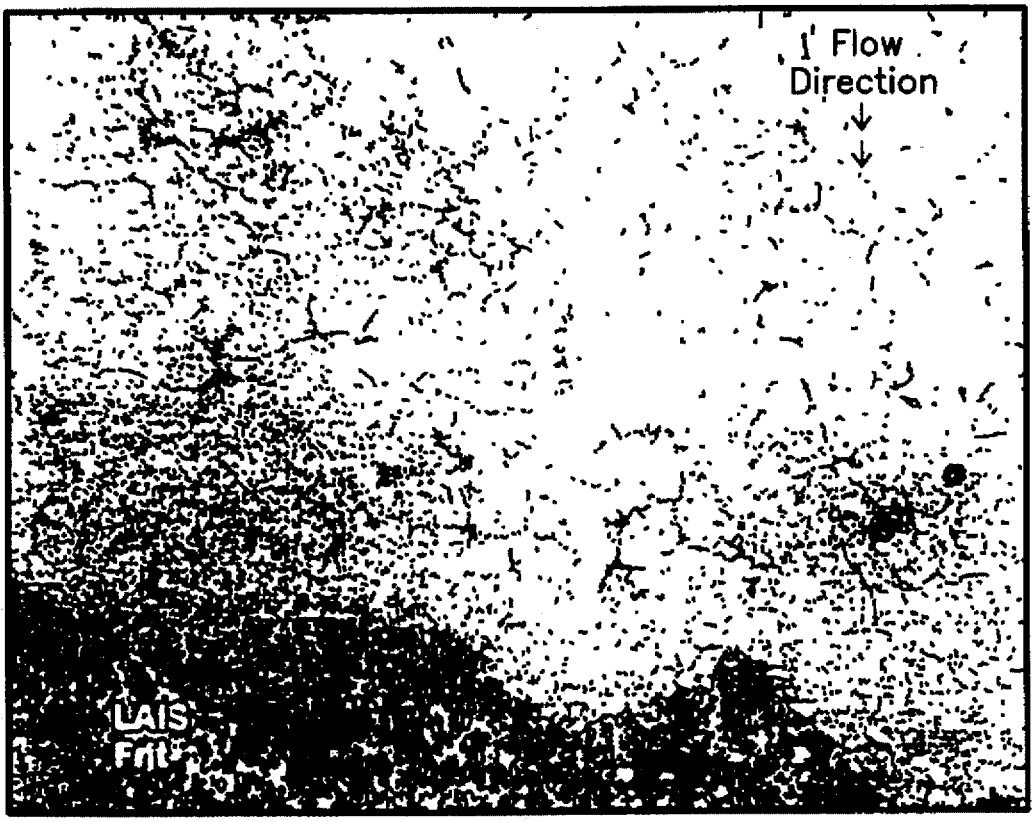
FIG. 6 is an optical photomicrograph showing aluminum metal prior to being filtered.
Figure 7:
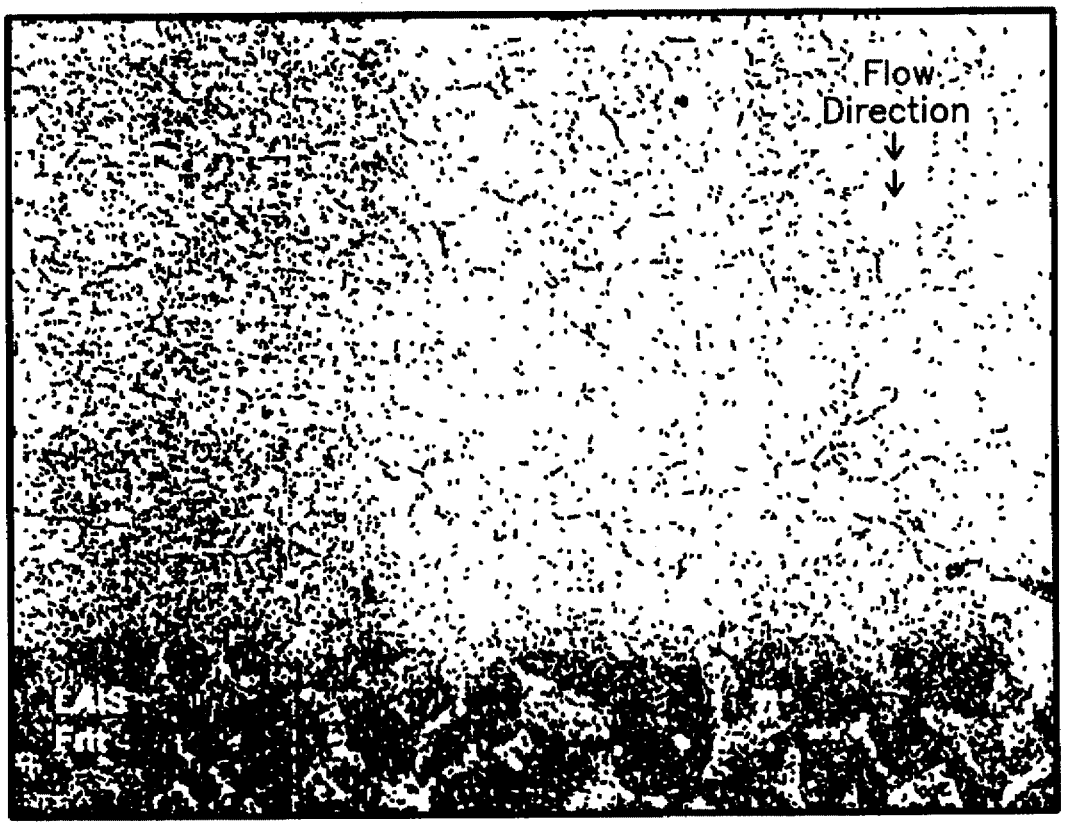
FIG. 7 is an optical photomicrograph showing aluminum metal which has been filtered utilizing the dual filtration system of the subject invention.

FIGS. 6 and 7 are optical photomicrographs of metal providing a visual comparison between unfiltered metal, as shown in FIG. 6, and metal which has been filtered utilizing the dual stage filtration system of the subject invention, as shown in FIG. 7. The small dark lines represent inclusions. It is clear from the photomicrographs that a substantial amount of inclusions are reduced utilizing the dual stage filtration system of the subject invention. Overall, the filtration efficiency was raised from 45%, utilizing a standard 30 PPI single stage ceramic foam filtration system, to 85% utilizing the dual stage system of the subject invention utilizing a 30 PPI first filter and a 50 PPI second filter.

An analysis and interpretation of a Lais Inclusion Test was made using statistics comparing a single 15 inch filter, a single 17 inch filter and the dual stage system of the present invention. A summary of the Lais Inclusion Test results are set forth in Table 1 below.

concerns. In addition, the system has broad utility in other applications, such as sheet ingot or continuous strip casting.

While one could assemble a dual stage filtration system utilizing two separate filter bowls, it is preferable that the design incorporate both filters into a single bowl in order to obtain a simple .compact design with minimum floor space requirements. The advantages with a dual stage system where both filters are incorporated in the single bowl are: less floor space required; often replaces the existing filter bowl; fewer refractory components are required; lower installation and operating costs; easier start up in that only a single preheating step and a single priming step are required; the cleanup is easier in that only one filter bowl is used; and there is less drain metal utilizing a single bowl.

While one could simply stack two filters on top of each other, it is preferred that two separate filter seating surfaces be used in order to obtain a gap, which is preferably 1 inch, between the two filters. The purpose of the gap is to prevent an interference fit between the two filters. There is a +/−1/16 inch dimensional tolerance band for the filters. The +/−1/16 tolerance with a 17° beveled angle on the filter translates to a vertical change in the filter seating of 0.21 inches. Therefore in order to assure proper filter seating, a vertical separation or gap between the two filters is preferred. In addition, the gap allows each filter to be removed separately at the completion of casting. If the two filters were in contact with one another, the filters would be very heavy with the hardened metal and, therefore, much more difficult to remove. Also by providing the gap, the metal in the filters will solidify more quickly and are much more easy to remove. While the use of the second stage finer filter adds flow resistant to the system, this resistance may be compensated by utilizing a larger than normal surface area filtration combination, i.e., a 20 inch upper filter and a 17 inch lower filter. In addition, one may enlarge the output tunnel to minimize tunnel flow constriction.

In order for the dual stage filter system to operate more effectively, uniform and consistent filter preheat should be

TABLE 1

| Transfer/ Filtration System | Avg. UNF, $mm^2/kg$ | Variance UNF, $mm^4/kg^2$ | Avg. F, $mm^2/kg$ | Variance F, $mm^4/kg^2$ | Calc. "t" Value | Critical "t" Value | Removal Efficiency, % |
|---|---|---|---|---|---|---|---|
| non-level pour/15" | 1.176 | 1.044 | 0.649 | 0.394 | 2.934 | 1.991 | 45 |
| level pour/17" | 0.968 | 0.412 | 0.472 | 0.135 | 3.673 | 2.017 | 51 |
| dual stage | 2.088 | 1.408 | 0.309 | 0.049 | 8.091 | 2.040 | 85 |

As can be seen, the removal efficiency used in the dual stage system was measured at 85%, while the efficiency of the single filter systems were 45% and 51% respectively.

The dual stage filtration system of the present invention offers high filtration efficiency by using two progressively finer pore size filters with progressively higher inclusion capture efficiencies. In some instances this may eliminate the need for an expensive in-line treatment system. It has been found that the use of a coarse first filter stage (for example, 30 to 40 PPI) will allow a fine second stage filter (for example, 50 to 60 PPI) to function without a problem of premature filter blockage with retained inclusion material.

One potential application of the dual stage filtration system of the subject invention is in aluminum extrusion billet casting where often times there is insufficient room for an in-line degasser system. Also, the installation cost of an in-line degasser system is quite high, and for effective inclusion removal, and requires the use of chlorine which is coming under scrutiny due to safety and environmental done. It has been found that traditionally inspirator burners which transfer heat to filters primarily by conduction and radiation are not suitable for preheating the dual stage filter system of the subject invention due to the additional filter thickness, the gap between the two filters and the general requirement for more uniform preheat. The present invention calls for a preheat system which utilizes convection heat transfer and, in particularly, utilizes an excess air burner, such as a nozzle mix gas burner. The burner utilizes a nozzle mix system capable of operating with a high excess air ratio of up to 600%. By controlling the amount of excess air, the output temperature of the burner may be controlled between 750° and 1,500° F. The excess air is obtained with an air injector which forces a flow of high pressure compressed air through the nozzle to generate a large flow of low pressure hot air.

Thus there is provided an improved dual stage metal filtration system which substantially increases the overall efficiency in the removal of inclusions in the molten aluminum production process, is easy and inexpensive to install, and is easy and inexpensive to maintain and to operate.

From the foregoing description of the preferred embodiment of the invention, it will be apparent that many modifications may be made therein. It will be understood, however, that this embodiment of the invention is an exemplification of the invention only and that the invention is not limited thereto. It is to be understood therefore that it is intended in the appended claims to cover all modifications as fall within the true spirit and scope of the invention.

What is claimed is:

1. An apparatus for removing inclusions from molten metal comprising:
   a container having a molten metal input and a molten metal output;
   a molten metal flow path between said input and said output;
   a first porous ceramic filter located in said flow path;
   a second porous ceramic filter located in said flow path between said first filter and said output; said first filter having a porosity between 20 PPI and 60 PPI; said second filter having a porosity between 40 PPI and 100 PPI; said second filter having a finer porosity than said first filter;
   a convection heating apparatus for providing hot gas;
   a gas flow path located between said heating apparatus and one of said filters.

2. An apparatus as set forth in claim 1, wherein said one of said filters is said second filter.

3. An apparatus as set forth in claim 2, wherein a region adjacent to said second filter is substantially sealed during the operation of said heating apparatus so that a positive gas pressure is applied to said second filter, whereby hot gas will flow through said second filter and through said first filter, thereby heating said second filter and said first filter.

4. An apparatus as set forth in claim 1, wherein said one of said filters is said first filter.

5. An apparatus as set forth in claim 4, wherein a region adjacent to said first filter is substantially sealed during the operation of said heating apparatus so that a positive gas pressure is applied to said first filter, whereby hot gas will flow through said first filter and through said second filter, thereby heating said first filter and said second filter.

6. An apparatus for removing inclusions from molten metal comprising:
   a container having a molten metal input and a molten metal output;
   a molten metal flow path between said input and said output;
   a first porous ceramic filter located in said flow path;
   a second porous ceramic filter located in said flow path between said first filter and said output; said first filter having a porosity between 20 PPI and 60 PPI; said second filter having a porosity between 40 PPI and 100 PPI; said second filter having a finer porosity than said first filter;
   said first filter is located above said second filter;
   a gap between said first filter and said second filter;
   an air vent structure for venting air which may be trapped in said gap.

7. An apparatus as set forth in claim 6, wherein the range of the width of said gap is ¼ inch to 3 inches.

8. An apparatus as set forth in claim 6, wherein the density of said filters are such that said filters are between 85% and 92% void.

9. An apparatus as set forth in claim 6, wherein said the thickness of each of said filters is in the range of 1½ inch to 4 inches.

10. An apparatus as set forth in claim 6, wherein the porosity of said second filter is at least 10 PPI finer than the porosity of said first filter.

11. An apparatus as set forth in claim 6, wherein said air vent structure is in the form of a vent cone temporarily located on said first filter.

12. An apparatus as set forth in claim 11, wherein said first filter is inclined at an angle from the horizontal; said vent cone located near the highest level of said first filter.

13. An apparatus as set forth in claim 6, wherein said air vent structure includes a bore hole in said container; said bore hole communicating with said gap.

14. An apparatus as set forth in claim 13, further including a porous plug received in said bore hole; said porous plug being constructed so that air, but not molten metal, will pass through said plug.

15. An apparatus as set forth in claim 12, wherein said angle of inclination is in the range from ½° to 20°.

16. An apparatus as set forth in claim 6, wherein the length of the first filter is greater than the length of the second filter along their respective major axis.

17. An apparatus as set forth in claim 16, wherein said first filter is from ¾ inch to 4 inches longer than said second filter.

18. An apparatus for removing inclusions from molten metal comprising:
   a container having a molten metal input and a molten metal output;
   a molten metal flow path between said input and said output;
   a first porous ceramic filter located in said flow path;
   a second porous ceramic filter located in said flow path between said first filter and said output;
   a convection heating apparatus for providing hot gas;
   a gas flow path located between said heating apparatus and one of said filters for preheating both of said filters.

19. An apparatus as set forth in claim 18, wherein said first filter is located above said second filter.

20. An apparatus as set forth in claim 19, further including a gap between said first filter and said second filter.

21. An apparatus as set forth in claim 20, wherein the range of the width of said gap is ¼ inch to 3 inches.

22. An apparatus as set forth in claim 18, wherein the density of said filters are such that said filters are between 85% and 92% void.

23. An apparatus as set forth in claim 18, wherein the thickness of each of said filters is in the range of 1½ inch to 4 inches.

24. An apparatus as set forth in claim 18, wherein the porosity of said second filter is at least 10 PPI finer than the porosity of said first filter.

25. An apparatus as set forth in claim 18, wherein said one of said filters is said second filter.

26. An apparatus as set forth in claim 25, wherein a region adjacent to said second filter is substantially sealed during the operation of said heating apparatus so that a positive gas pressure is applied to said second filter, whereby hot gas will flow through said second filter and through said first filter, thereby heating said second filter and said first filter.

27. An apparatus as set forth in claim 18, wherein said one of said filters is said first filter.

28. An apparatus as set forth in claim 27, wherein a region adjacent to said first filter is substantially sealed during the operation of said heating apparatus so that a positive gas pressure is applied to said first filter, whereby hot gas will flow through said first filter and through said second filter, thereby heating said first filter and said second filter.

29. An apparatus as set forth in claim 20, further including an air vent structure for venting air which is trapped in said gap.

30. An apparatus as set forth in claim 29, wherein said air vent structure is in the form of a vent cone located on said first filter.

31. An apparatus as set forth in claim 30, wherein said first filter is inclined at an angle-from the horizontal; said vent cone located near the highest level of said first filter.

32. An apparatus as set forth in claim 31, wherein said angle of inclination is in the range from ½° and 20°.

33. An apparatus as set forth in claim 20, wherein the length of the first filter is greater than the length of the second filter along their respective major axis.

34. An apparatus as set forth in claim 33, wherein said first filter is from ¾ inch to 4 inches longer than said second filter.

35. An apparatus for removing inclusions from molten metal comprising:
    a container having a molten metal input and a molten metal output;
    a molten metal flow path between said input and said output;
    a first porous ceramic filter located in said flow path;
    a second porous ceramic filter located in said flow path between said first filter and said output;
    first filter located above said second filter;
    a gap formed between said first and said second filters;
    an air vent structure for venting air which may be trapped within said gap.

36. An apparatus as set forth in claim 35, wherein the range of the width of said gap between said filters is ¼ inch to 3 inches.

37. An apparatus as set forth in claim 35, wherein said air vent structure is in the form of a vent cone located on said first filter.

38. An apparatus as set forth in claim 37, wherein said first filter is inclined at an angle from the horizontal; said vent cone located near the highest level of said first filter.

39. An apparatus as set forth in claim 38, wherein said second filter is inclined at an angle from the horizontal.

40. An apparatus as set forth in claim 35, wherein said air vent structure is a bore hole in said container, said bore hole communicating with said gap.

41. An apparatus as set forth in claim 40, further including a porous plug received in said bore hole; said plug having a porosity such that air, but not molten metal, will pass through said plug.

42. An apparatus as set forth in claim 39, wherein said angles of inclination of said first and said second filters are in the range from ½° to 20°.

43. A method for substantially simultaneously preheating a pair of filters in a dual stage filtration system, said system for removing inclusions in molten metal and including a container having a molten input and a molten metal output; a molten metal flow path between said input and said output; a first porous ceramic filter located in said flow path; a second porous ceramic filter located in said flow path between said first filter and said output, comprising the steps of:
    sealing a region adjacent to one of said filters;
    applying heat by convection to said region thereby resulting in a positive pressure in said region;
    passing said convection heat through said first filter and through said second filter;
    unsealing said region.

44. A method as set forth in claim 43, further including the steps of providing said preheat burner with an excess air ratio of up to 600% whereby the output temperature of said burner is maintained between 750° and 1,500° F.

45. A method as set forth in claim 43, wherein said region is located below said second filter.

46. A method as set forth in claim 43, wherein said region is located above said first filter.

47. A method for venting trapped air from a dual filtration apparatus; said apparatus including a container having a molten input and a molten metal output; a molten metal flow path between said input and said output; a first porous ceramic filter located in said flow path; a second porous ceramic filter located in said flow path between said first filter and said output; said first filter being located above said second filter; a gap located between said first filter and said second filter, comprising the steps of:
    venting air from said gap between said filters.

48. A method as set forth in claim 47, further including the steps of applying a vent cone to the top of said first filter, sealing said vent cone to said first filter, applying molten metal primer to said first filter, thereby forcing air from said first filter into said gap, moving said forced air through said first filter and through said cone, and removing said cone from first filter.

* * * * *